United States Patent
Zhang et al.

(10) Patent No.: US 8,520,635 B2
(45) Date of Patent: Aug. 27, 2013

(54) METHOD AND SYSTEM FOR INTRA BASE STATION CARRIER HANDOVER

(75) Inventors: Ruixia Zhang, Guangdong (CN); Wenhuan Wang, Guangdong (CN); Min Liu, Guangdong (CN); Kaiying Lv, Guangdong (CN); Nan Li, Guangdong (CN); Huiying Fang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 258 days.

(21) Appl. No.: 13/061,778

(22) PCT Filed: Dec. 22, 2008

(86) PCT No.: PCT/CN2008/073650
§ 371 (c)(1),
(2), (4) Date: Mar. 2, 2011

(87) PCT Pub. No.: WO2010/025604
PCT Pub. Date: Mar. 11, 2010

(65) Prior Publication Data
US 2011/0170519 A1      Jul. 14, 2011

(30) Foreign Application Priority Data
Sep. 3, 2008    (CN) .......................... 2008 1 0212900

(51) Int. Cl.
*H04W 4/00* (2009.01)

(52) U.S. Cl.
USPC .......................................... 370/331; 455/436

(58) Field of Classification Search
CPC . H04W 36/06; H04W 36/0055; H04W 36/18; H04W 36/30; H04W 28/06
IPC ................ H04W 36/06, 36/18, 36/0055, 36/30, H04W 88/08
See application file for complete search history.

(56) References Cited

U.S. PATENT DOCUMENTS

| 6,167,260 | A | 12/2000 | Azam et al. |
| 6,449,481 | B1 | 9/2002 | Kwon et al. |
| 2002/0052201 | A1 | 5/2002 | Wilhelmsson et al. |
| 2008/0268833 | A1* | 10/2008 | Huang et al. ............... 455/425 |
| 2009/0017854 | A1 | 1/2009 | Arimitsu |

FOREIGN PATENT DOCUMENTS

| CN | 101156472 A | 4/2008 |
| CN | 101222464 A | 7/2008 |
| WO | 2007112761 A1 | 10/2007 |
| WO | 2007132365 A1 | 11/2007 |

OTHER PUBLICATIONS

Supplementary European Search Report, European Patent Office, Apr. 4, 2012, Munich, Germany.

* cited by examiner

*Primary Examiner* — Jung Park
(74) *Attorney, Agent, or Firm* — Christopher L. Parmelee; Walker & Jocke (57) ABSTRACT

A method and a system for intra-BS carrier handover are provided. The method comprises: a mobile station scanning predetermined carriers within the base station based on predetermined rules; obtaining a scanning report comprising channel quality information of part of or all of the predetermined carriers; and sending the scanning report to the base station; the base station obtaining the channel quality information in the scanning report; selecting a target carrier from the predetermined carriers; and informing the mobile station of the selected target carrier via a message; and the mobile station handing over to the target carrier in a predetermined manner in response to the message. By using the method, seamless handover of intra-BS carriers can be performed in a multi-carrier system for ensuring the service continuity of the mobile station to eliminate carrier handover time delay.

18 Claims, 9 Drawing Sheets

METHOD AND SYSTEM FOR INTRA BASE STATION CARRIER HANDOVER

FIELD OF THE INVENTION

The present invention relates to the field of communication, and particularly, to a method and system for intra base station carrier handover.

BACKGROUND OF THE INVENTION

Figure 1:
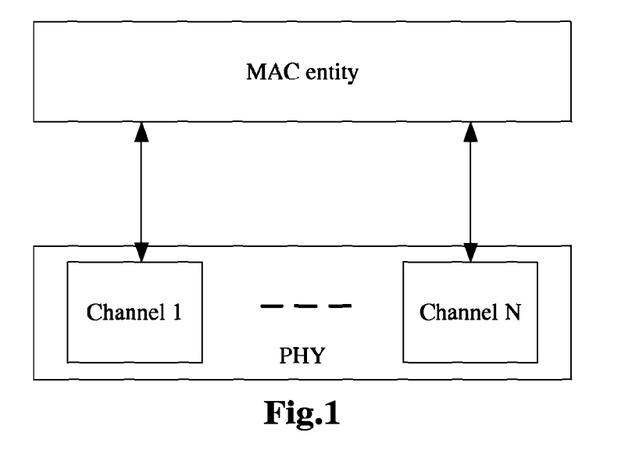
FIG. 1 is an architecture schematic diagram of a multi-carrier system in the related art.

In the related art, an 802.16m system, as an evolution system of an 802.16e system, is a multi-carrier system based on Orthogonal Frequency Division Multiplex Access (OFDMA for short) technology. The architecture of the multi-carrier system is as shown in FIG. 1. A single Media Access Control (MAC for short) entity controls a physical layer (PHY for short) comprising a plurality of channels, for example, the PHY includes a channel 1, a channel 2 . . . a channel N. Each channel may have a different bandwidth, e.g. the bandwidth of channel 1 is 5 MHz, the bandwidth of channel 2 is 10 MHz, and the bandwidth of channel N is 20 MHz. Moreover, the bandwidths of the above channels are continuous or discontinuous frequency bands.

At present, the carriers in a multi-carrier system (e.g. the 802.16m system) can be classified into two types, viz. a primary carrier and a secondary carrier, wherein the primary carrier refers to a carrier for interacting services and all PHY/MAC control information between a Base Station (BS for short) and a Mobile station (MS for short). In addition, the primary carrier is also used for controlling the operation of the MS, such as network access, etc. In a cell, each MS has only one primary carrier.

The secondary carrier is an additional carrier which is received on the primary carrier based on specific commands and rules of the BS for transmitting services for the MS. The secondary carrier may also comprise some control signaling supporting multi-carrier operations. In one cell, each MS may have one or more secondary carriers or no secondary carrier. The MS may obtain part of the information of the secondary carrier via the primary carrier, for instance, whether the secondary carrier is present, the position and configuration information of the secondary carrier, etc.

In the related art, the carriers in the multi-carrier system may have different configurations, e.g. a fully-configured carrier and a partially-configured carrier, wherein the fully-configured carrier refers to a carrier configured with all the control channels which include synchronization, broadcast, multicast, unicast control signaling channels and additionally, the information and parameter channels related to multi-carrier operations and other carriers. The partially-configured carrier refers to a carrier only comprising a basic control channel configuration used for supporting service interaction in the multi-carrier operations. In consideration of the application of the primary carrier and secondary carrier, the primary carrier has to be a fully-configured carrier, while the secondary carrier may be either a fully-configured carrier or a partially-configured carrier which depends on a usage and configuration model.

Figure 2:
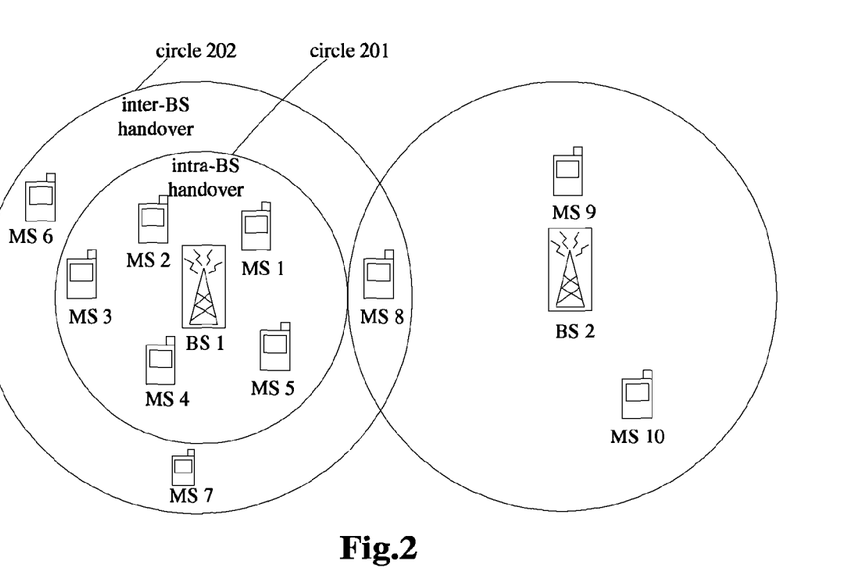
FIG. 2 is a schematic diagram of cell user classification in a base station in the related art.

In a communication system, users within a base station can be classified into a user in the center of the cell and a user at the edge of the cell. As shown in FIG. 2, relative to base station 1, the users within the range of the circle 201 (a mobile station 1, a mobile station 2 . . . a mobile station 5) are users in the center of the cell, while the users within the range of a circle 202 (a mobile station 6, a mobile station 7, and a mobile station 8) are users at the edge of the cell. Of course, the circle 201 and the circle 202 are provided for illustratively distinguishing the two kinds of users. In a practical application, distinguishing between the users in the center of the cell and the users at the edge of the cell depends on actual conditions of the base station.

As for the user at the edge of the cell, since Quality of Service (QoS for short) is degraded due to channel fading, the MS will terminate the connection with the current serving base station and hand over to other adjacent base stations so as to obtain a better QoS. The above process is an inter-BS handover.

As for the user in the center of the cell of the 802.16m multi-carrier system, the carrier where a user is located might be overloaded with the increase of the services and the introduction of new services, while other carriers of a service BS might be lightly loaded. The carrier of the user can be handed over to other carriers of the serving BS to achieve a load balance for the system. In addition, different carriers of the discontinuous frequency band might experience various degrees of fading. Since the channel quality of the carrier where the user is located is degraded, the carrier of user can be handed over to other carriers of the serving BS with better channel quality so as to better meet the QoS demand of the user. The above process is called as an intra-BS carrier handover.

The 802.16e system is a single-carrier system with only the inter-BS handover present. The inter-BS handover process mainly includes a cell reselection, a handover decision and initiation, network re-access, context termination of a MS in a serving BS, etc. A certain handover interruption time delay is present in the inter-BS handover from the handover initiation to the successful re-access to a target BS.

The 802.16m system is a multi-carrier system with the inter-BS handover and the intra-BS carrier handover existing. When performing the intra-BS carrier handover, since the MSs are served by the same BS, handover interruption time delay will result in service discontinuity, such that seamless handover can not be achieved.

SUMMARY OF THE INVENTION

The present invention is proposed in consideration of the problem that the service continuity of the mobile station can not be guaranteed due to handover interruption time delay occurring in the inter-BS handover method for the single-carrier system at the present. In this regard, the main object of the present invention is to provide an improved intra-BS carrier handover solution to solve the above problem present in the related art.

In order to realize the above object, according to one aspect of the present invention, there is provided an intra-BS carrier handover method for handing-over carriers within a base station in a multi-carrier system.

The intra-BS carrier handover method according to the present invention comprises: a mobile station scanning predetermined carriers within the base station based on predetermined rules; obtaining a scanning report comprising channel quality information of part of or all of the predetermined carriers; and sending the scanning report to the base station; the base station obtaining the channel quality information in the scanning report; selecting a target carrier from the predetermined carriers; and informing the mobile station of the selected target carrier via a message; and the mobile station handing over to the target carrier in a predetermined manner in response to the message.

Preferably, before the step of the mobile station scanning the predetermined carriers based on the predetermined rules, the method further comprises: the mobile station obtaining, via its primary carrier, broadcast information related to multi-carrier operations and configuration information of other carriers except the current primary carrier, which are configured in the base station, and obtaining information related to multi-carrier scanning according to the configuration information and the broadcast information related to multi-carrier operations.

Preferably, the predetermined rules comprise at least one of the followings: the mobile station periodically scanning the predetermined carriers according to the information related to multi-carrier scanning; the mobile station scanning the predetermined carriers in an event triggering manner based on the information related to multi-carrier scanning; and the mobile station receiving a notifying message sent by the base station, and scanning the predetermined carriers based on scanning information carried in the notifying message, wherein the scanning information comprises at least one of the followings: a list of carriers to be scanned, a start time for scanning and a scanning interval.

Preferably, the step of the base station selecting a target carrier comprises: the base station selecting the target carrier based on the channel quality information and carrier load conditions obtained in advance by the base station, moreover if a source carrier of the mobile station is a primary carrier of the mobile station, the target carrier is a fully-configured carrier; and if the source carrier is a secondary carrier of the mobile station, the target carrier is the fully-configured carrier or the partially-configured carrier.

Preferably, the message is a carrier handover notifying message.

Preferably, the carrier handover notifying message carries source carrier information of the mobile station and indication information indicating whether to perform synchronization on the target carrier, moreover, in the case that the target carrier and the source carrier meet a predetermined condition, the carrier handover notification also carries at least one of the followings: a specified ranging code and specified ranging resource information on the target carrier.

Preferably, the predetermined condition is: the center frequency difference between the target carrier and the source carrier is greater than a predetermined frequency difference $^\Delta f$.

Preferably, after the predetermined condition is met and the base station sends the carrier handover notification, the method further comprises: the base station storing a mapping relationship among a mobile station identifier, the specified ranging code, and the specified ranging resource.

Preferably, in the case that the carrier handover notifying message carries the indication information and the indication information indicates that synchronization is needed, the step of the mobile station handing over to the target carrier in a predetermined manner comprises: the mobile station sending the specified ranging code on the specified ranging resource of the target carrier in response to the carrier handover notifying message; and the mobile station receiving on its primary carrier a ranging response message sent by the base station based on the mapping relationship and handing over in the predetermined manner from the source carrier to the target carrier.

Preferably, in the case that the source carrier is a primary carrier of the mobile station, the predetermined manner comprises: the mobile station maintaining a connection with the base station on the current main carrier, before predetermined time arrives; and when the predetermined time arrives, the mobile station handing over to the target carrier, parsing the obtained control information on the target carrier, and taking the target carrier as a primary carrier of the mobile station.

Preferably, in the case that the source carrier is a primary carrier of the mobile station, the predetermined manner comprises: the mobile station receiving, via the source carrier, a notification of assigning resource for the mobile station on the target carrier by the base station; the mobile station receiving or sending data at the indicated position of the target carrier according to the notification of assigning resource; and the mobile station parsing the control information obtained by the mobile station from the target carrier and taking the target carrier as a primary carrier of the mobile station when the next superframe arrives.

Preferably, in the case that the source carrier is a secondary carrier of the mobile station, the predetermined manner comprises: the mobile station receiving, via the primary carrier, a notification of assigning resource for the mobile station on the target carrier by the base station; and in response to the notification of assigning resource, the mobile station terminating a connection with the source carrier, handing over to the target carrier, and receiving or sending data at the indicated position of the target carrier.

Preferably, the predetermined carriers comprise: fully-configured carriers and partially-configured carriers supported by the mobile station and configured by the base station, except the primary carrier and the secondary carrier of the mobile station.

In order to achieve the above object, according to another aspect of the present invention, there is provided an intra-BS carrier handover system used for the handover of the intra-BS carriers in a multi-carrier system.

The intra-BS carrier handover system according to the present invention comprises: a mobile station, configured to scan predetermined carriers within the base station based on predetermined rules, obtain a scanning report comprising channel quality information of part of or all of the predetermined carriers, and send the scanning report to the base station; the base station, configured to obtain the channel quality information in the scanning report, select a target carrier from the predetermined carriers, and inform the mobile station of the selected target carrier via a carrier handover notifying message; and the mobile station, further configured to hand over to the target carrier in a predetermined manner based on a predetermined message of the base station.

Preferably, the predetermined carriers comprise: fully-configured carriers and partially-configured carriers supported by the mobile station and configured by the base station, except the primary carrier and the secondary carrier of the mobile station; and/or in the case that the source carrier is a primary carrier of the mobile station, the predetermined manner comprises: presetting a handover time, and before the handover time arrives, maintaining, by the mobile station, a connection with the base station on the current primary carrier; when the handover time arrives, the mobile station hands over to the target carrier, parses the obtained control information on the target carrier, and takes the target carrier as a primary carrier of the mobile station; or the mobile station receives via the source carrier a notification of assigning resource for the mobile station on the target carrier by the base station; the mobile station receives or sends data at the indicated position of the target carrier according to the notification of assigning resource; when the next superframe arrives, the mobile station parses the control information obtained by the mobile station from the target carrier and takes the target carrier as a primary carrier of the mobile station; or in the case that the source carrier is a secondary carrier of the mobile station, the predetermined manner comprises: the mobile station receiving, via the primary carrier, a notification of assigning resource for the mobile station on the target carrier by the base station; and in response to the notification of assigning resource, the mobile station terminates a connection with the source carrier, hands over to the target carrier, and receives or sends data at the indicated position of the target carrier.

By means of the technical solution of the present invention, the problem that the service continuity of the mobile station can not be guaranteed due to handover interruption time delay present in the related art is solved by virtue of the intra-BS carrier handover solution of the present invention, thereby the mobile station can perform seamless handover between intra-BS carriers in the multi-carrier system, such that the service continuity of the mobile station can be ensured and furthermore the time delay for carrier handover can be eliminated.

Other characteristics and advantages of the present invention will be described in the following part of the Description, and partially apparent from the Description, or understood by implementing the present invention. The object and other benefits of the present invention can be realized or obtained by the structure particularly mentioned in the Description, claims, and the drawings.

BRIEF DESCRIPTION OF THE DRAWINGS

The drawings provide a further understanding of the present invention and form a part of the Description. The drawings together with the embodiments of the present invention are used to explain the present invention without unduly limiting the same, wherein.

DETAILED DESCRIPTION OF THE EMBODIMENTS

Functional Generalization

At present, since the problem that the service continuity of the mobile station can not be guaranteed due to handover interruption time delay arises when the mobile station performs an intra-BS carrier handover, the present invention provides an intra-BS carrier handover solution. In the multi-carrier system of the embodiment of the present invention, a method for the MS to realize an intra-BS carrier handover mainly includes four steps: 1. scanning other carriers in the BS; 2. selecting a target carrier; 3. performing synchronization on the target carrier; and 4. realizing a target carrier handover, wherein the target carrier handover includes two cases: a primary carrier handover and a secondary carrier handover, and the primary carrier is handed over using two predetermined manners of the embodiment of the present invention.

The preferable embodiments of the present invention are described in conjunction with the drawings. It shall be understood that the preferable embodiments described herein are merely used for describing and explaining the present invention rather than limiting the present invention.

In the subsequent description, multiple specific details are described for the sake of explanation, to provide a thorough understanding of the present invention. However, it is obvious that the present invention can also be realized without these specific details. In addition, the following embodiments and respective details thereof may be combined variously without departing from the spirit and scope of the attached claims.

Method Embodiments

According to an embodiment of the present invention, there is provided a method for intra-BS carrier handover which is used for the handover of carriers within a base station in a multi-carrier system.

Figure 3:
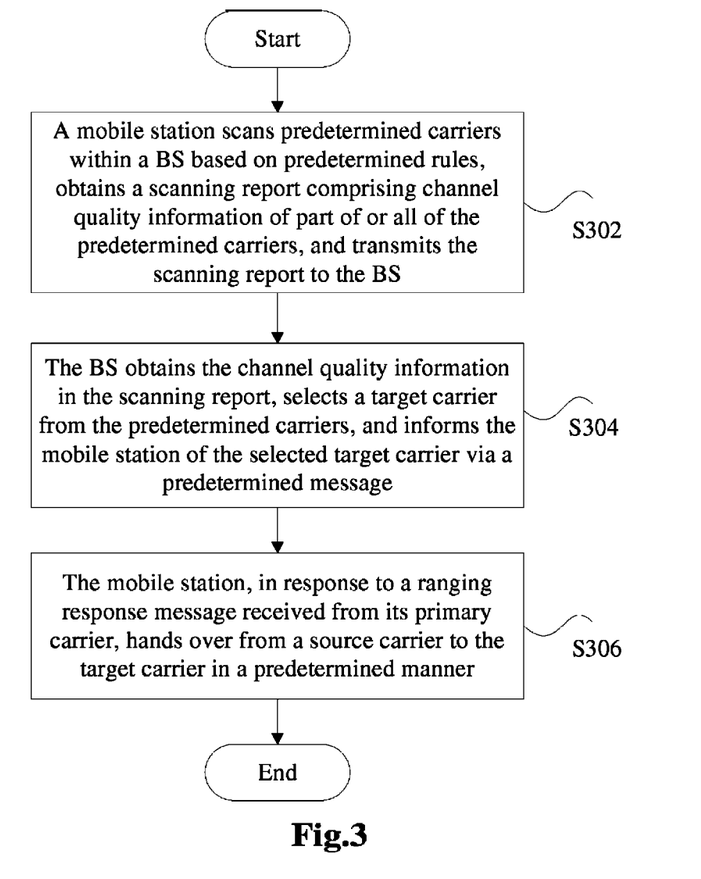
FIG. 3 is a flow chart of the method for intra-BS carrier handover according to an embodiment of the present invention.

Preferably, the MS obtains, via its primary carrier, configuration information of other carriers configured in a base station except the current primary carrier, as well as broadcast information related to multi-carrier operations, and obtains information related to multi-carrier scanning according to the configuration information and the broadcast information related to the multi-carrier operations. After obtaining the information related to the multi-carrier scanning, the following processes as shown in FIG. 3 are performed (Step S302 to Step S306), wherein FIG. 3 is a flow chart of the method for intra-BS carrier handover according to an embodiment of the present invention.

Step S302: the MS scans predetermined carriers within the BS based on predetermined rules, obtains a scanning report comprising channel quality information of part of or all of the predetermined carriers, and sends the scanning report to the BS, wherein the above predetermined carriers are fully-configured carriers and partially-configured carriers supported by the MS and configured by the BS except the primary carrier and the secondary carrier of the MS.

The predetermined rules in Step S302 can include but are not limited to one of the followings: 1. the MS periodically scans the predetermined carriers according to the information related to multi-carrier scanning; 2. the MS scans the predetermined carriers in an event triggering manner according to the information related to multi-carrier scanning, for example, a predetermined threshold is set, and a scanning event is triggered if the MS judges that certain information exceeds the set predetermined threshold; and 3. the MS receives a notifying message sent by the BS and scans the predetermined carriers according to the scanning information carried in the notifying message, wherein the scanning information can include information such as a list of carriers to be scanned, a start time for scanning, a scanning interval, etc.

Step S304: the BS obtains the channel quality information in the scanning report, selects a target carrier from the predetermined carriers and informs the MS of the selected target carrier via a predetermined message, for example, the predetermined message herein can be a carrier handover notifying message. As shown in the following Table 1, the carrier handover notifying message can further carry source carrier information of the MS and indication information indicating whether to perform synchronization on the target carrier, wherein in the case that the target carrier and the source carrier meet the following predetermined conditions, the BS carries a specified ranging code and specified ranging resource information of the target carrier in the carrier handover notification.

Regarding a Carrier Handover Notifying Message

| Name | Notes |
|---|---|
| MS identifier | for identifying a MS |
| source carrier frequency | for identifying a source carrier |
| target carrier frequency | for identifying a target carrier |
| synchronization identifier | for identifying whether the MS needs to be synchronized with a serving BS on the target carrier, wherein 0 represents not requiring the synchronization and 1 represents requiring the synchronization |
| If (requiring synchronization) { Specified ranging code Specified ranging resource } | it is assigned on the target carrier |

Regarding Rules of Selecting Target Carrier

In Step S304, the BS may select the target carrier of the MS based on the following rules: 1. the target carrier is selected based on the channel quality information and carrier load conditions obtained in advance by the BS before selecting the target carrier; 2. in the case that the source carrier of the MS is a primary carrier of the MS, the target carrier is a fully-configured carrier; and 3. in the case that the source carrier is a secondary carrier of the MS, the target carrier is a fully-configured carrier or a partially-configured carrier, wherein the source carrier includes primary carrier and secondary carrier of the mobile station.

Regarding Predetermined Conditions

As an implementing manner, the above predetermined conditions can be set as follows: the center frequency difference between the target carrier and the source carrier is greater than a predetermined frequency difference f. That is to say, in the case that the center frequency difference between the target carrier and the source carrier is less than the predetermined frequency difference f, the MS and the BS do not need any synchronization. In the case that the center frequency difference between the target carrier and the source carrier is greater than the predetermined frequency difference f, the BS further carries a specified ranging code and specified ranging resource information of the target carrier in the carrier handover notification. Preferably, the BS also stores a mapping relationship among a MS identifier, a specified ranging code, and specified ranging resource.

After Step S304, if the above predetermined conditions are met, then in the case that the MS needs to be synchronized with the BS on the target carrier, the MS sends the specified ranging code on the specified ranging resource of the target carrier, moreover, after sending the specified ranging code, there is no need to wait for a response message on the target carrier, but to receive a ranging response message sent by the BS on the primary carrier. What needs to be explained is that the BS sends the ranging response message to the MS based on the previously stored mapping relationship.

Step S306, the MS performs handover from the source carrier to the target carrier in a predetermined manner in response to the ranging response message received from the primary carrier.

Regarding Predetermined Manner

1. In the case that the above source carrier is a primary carrier of the MS, the predetermined manner (also referred to as a handover mode 1) is configured as: 1. before predetermined time arrives, the MS maintains a connection with the BS on the current primary carrier; 2. in the case that the predetermined time arrives, the MS hands over to the target carrier, parses the obtained control information on the target carrier, and takes the target carrier as a primary carrier of the MS.

2. In the case that the source carrier is a primary carrier of the MS, the predetermined manner (also referred to as a handover mode 2) is configured as: 1. the MS receives via the source carrier a notification of assigning resource for the MS on the target carrier by the BS; 2. the MS receives or sends data at the indicated position of the target carrier according to the notification of assigning resource; and 3. in the case that the next superframe begins, the MS parses the control information obtained by the MS from the target carrier, and takes the target carrier as a primary carrier of the MS.

3. in the case that the above source carrier is a secondary carrier of the MS, the predetermined manner is configured as: the MS receives via the primary carrier a notification of assigning resource for the MS on the target carrier by the BS; in response to the notification of assigning resource, the MS terminates a connection with the source carrier, hands over to the target carrier, and receives or sends data at the indicated position of the target carrier.

What needs to be explained is that the MS in the multi-carrier system can be classified into a sing-radio MS and a multi-radio MS depending on the different number of Radio Frequency (RF for short). The following examples are provided in the embodiment of the present invention based on different types of MSs and different carrier handover conditions and manners.

EXAMPLE 1

The Single-Radio MS Carrier is Subjected to an Intra-Bs Primary Carrier Handover Under the Handover Mode 1

Figure 4:
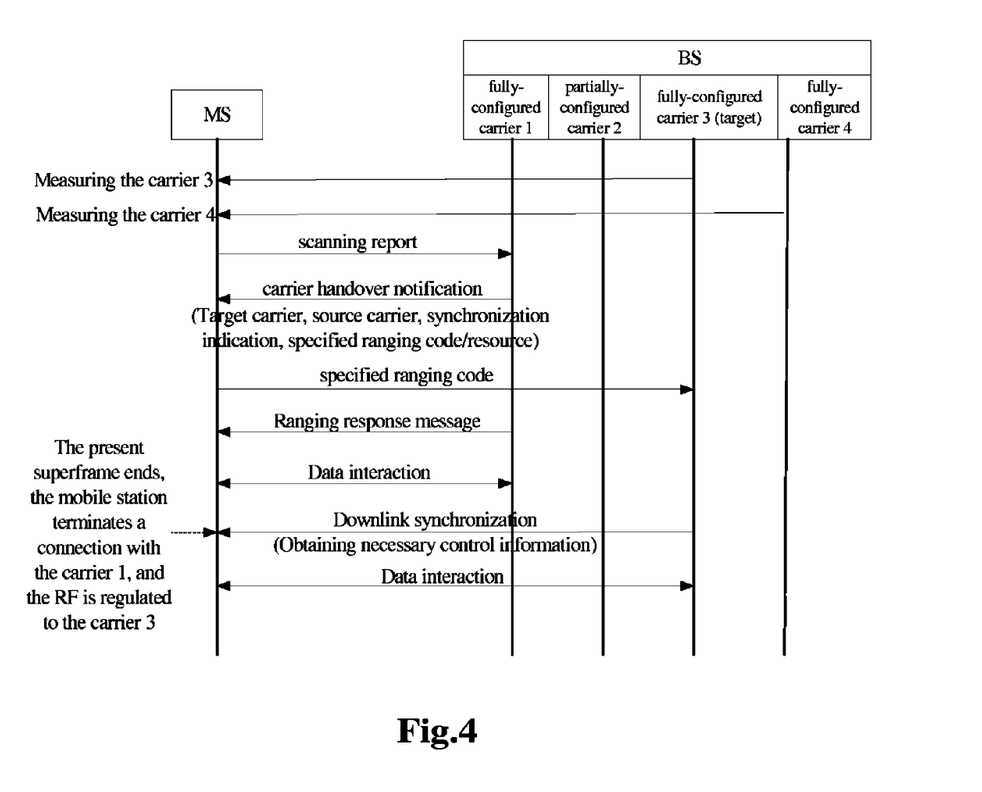
FIG. 4 is a flow chart of Example 1 of the method for intra-BS carrier handover according to an embodiment of the present invention.

FIG. 4 is a flow chart of Example 1 of the method for intra-BS carrier handover according to an embodiment of the present invention. FIG. 4 shows a single-radio MS and a serving BS, wherein the serving BS has four carriers, which are a fully-configured carrier 1, a partially-configured carrier 2, a fully-configured carrier 3, and a fully-configured carrier 4. The primary carrier of the MS is the fully-configured carrier 1, and the secondary carrier is the partially-configured carrier 2. The process in which the single-radio MS carrier is subjected to an intra-BS primary carrier handover in the handover mode 1 includes steps as follows.

Step 1: the MS scans other carriers of the BS (viz. the above predetermined carriers, and in the present embodiment, the predetermined carriers are carrier 3 and carrier 4) in a scanning interval and sends a scanning report (corresponding to Step S302 in FIG. 3).

Step 2: the BS selects the fully-configured carrier 3 as the target carrier, informs the MS on the fully-configured carrier 1 (the primary carrier of the MS), and meanwhile sends the frequency of the fully-configured carrier 1 (the information of the primary carrier of the MS), synchronization indication=1 (1 represents that the MS needs to be synchronized with the serving BS on the target carrier), a specified ranging code, and specified ranging resource on the fully-configured carrier 3 (the target carrier of the MS) (corresponding to Step S304 of FIG. 3).

Step 3: the MS sends the specified ranging code at the indicated time-frequency position of the fully-configured carrier 3.

Step 4: the MS receives a ranging response message on the fully-configured carrier 1. The MS and the BS achieve uplink synchronization on the fully-configured carrier 3.

Step 5: the MS maintains a connection on the fully-configured carrier 1 until the present superframe ends.

Step 6: when the next superframe begins, the RF of the MS is regulated to the fully-configured carrier 3, necessary control information is parsed (e.g. resource assignment information), it interacts services and control information with the serving BS, and the fully-configured carrier 3 becomes a new primary carrier of the MS (step 3 to step 6 correspond to Step S306 in FIG. 3).

By the above processes, the intra-BS primary carrier handover is realized for the single-radio MS carrier.

EXAMPLE 2

The Single-Radio MS Carrier is Subjected to an Intra-BS Carrier Handover Under the Handover Mode 2

Figure 5:
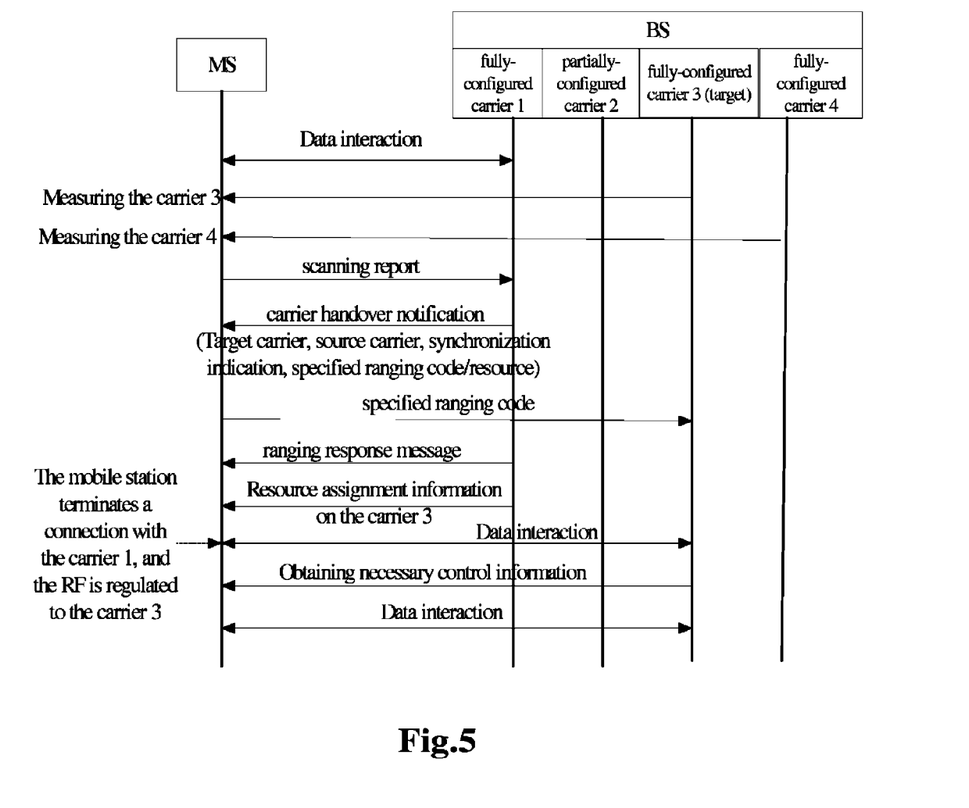
FIG. 5 is a flow chart of Example 2 of the method for intra-BS carrier handover according to an embodiment of the present invention.

FIG. 5 is a flow chart of Example 2 of the method for intra-BS carrier handover according to an embodiment of the present invention. As shown in FIG. 5, there are included the following processes:

Step 1: the MS scans other carriers of the BS (viz. the above predetermined carriers, and in the present embodiment, the predetermined carriers are carrier 3 and carrier 4) in a scanning interval and sends a scanning report (corresponding to Step S302 in FIG. 3).

Step 2: the BS selects the fully-configured carrier 3 as the target carrier, informs the MS on the fully-configured carrier 1 (the primary carrier of the MS) and meanwhile sends the frequency of the fully-configured carrier 1, synchronization indication=1 (the MS needs to be synchronized with the serving BS on the target carrier), a specified ranging code, and specified ranging resource on the fully-configured carrier 3 (corresponding to Step S304 of FIG. 3).

Step 3: the MS sends the specified ranging code at the indicated time-frequency position of the fully-configured carrier 3.

Step 4: the MS receives a ranging response message on the fully-configured carrier 1. The MS and the BS achieve uplink synchronization on the fully-configured carrier 3.

Step 5: the BS assigns resource for the MS on the fully-configured carrier 3 and sends resource assignment information to the MS via the fully-configured carrier 1.

Step 6: the MS terminates the connection of the fully-configured carrier 1, with the RF regulated to the fully-configured carrier 3, and receives or sends data at the indicated position.

Step 7: when the next superframe begins, the MS obtains necessary control information (e.g. resource assignment information) of the fully-configured carrier 3, interacts services and control information with the BS, and the fully-configured carrier 3 becomes a new primary carrier of the MS (step 3 to step 7 correspond to Step S306 in FIG. 3).

By the above processes, the intra-BS primary carrier handover is realized for the single-radio MS carrier in the mode 2.

EXAMPLE 3

Intra-BS Secondary Carrier Handover for a Single-Radio MS

Figure 6:
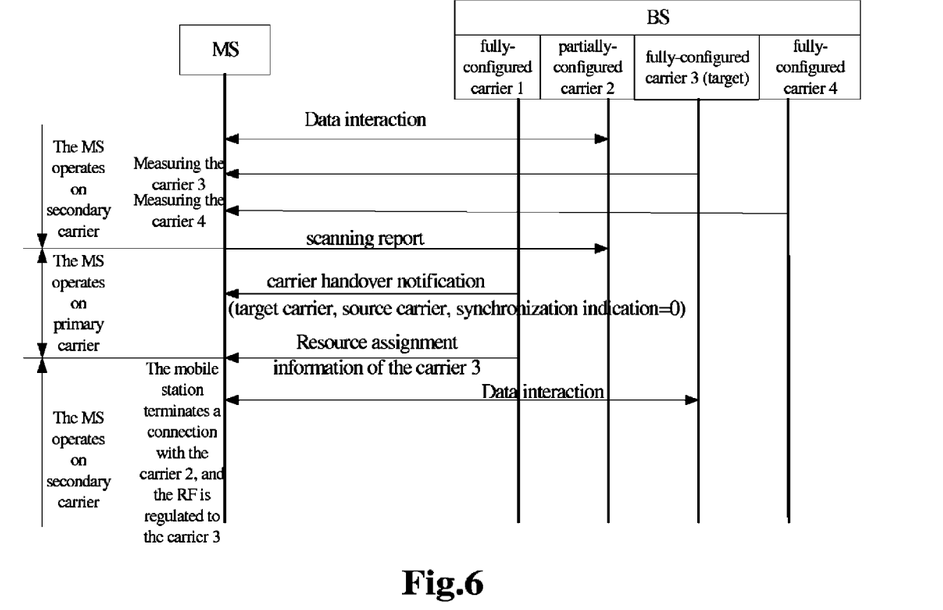
FIG. 6 is a flow chart of Example 3 of the method for intra-BS carrier handover according to an embodiment of the present invention.

FIG. 6 is a flow chart of Example 3 of the method for intra-BS carrier handover according to an embodiment of the present invention. As shown in FIG. 6, there are included the following processes:

Step 1: the MS scans other carriers of the BS (viz. the above predetermined carriers, and in the present embodiment, the predetermined carriers are carrier 3 and carrier 4) in a scanning interval and sends a scanning report (corresponding to Step S302 in FIG. 3).

Step 2: the BS selects the fully-configured carrier 3 as the target carrier, informs the MS on the fully-configured carrier 1, and meanwhile sends the frequency of the partially-configured carrier 2 (the secondary carrier of the MS) and synchronization indication=0 (0 represents that the MS does not need to be synchronized with the serving BS on the target carrier) (corresponding to Step S304 of FIG. 3).

Step 3: the BS assigns resource for the MS on the fully-configured carrier 3 and sends resource assignment information to the MS via the fully-configured carrier 1.

Step 4: the MS terminates the connection with the partially-configured carrier 2, is regulated to the fully-configured carrier 3, and receives or sends data at the indicated position (step 3 and step 4 correspond to Step S306 in FIG. 3).

By the above processes, the intra-BS secondary carrier handover is realized for the single-radio MS.

EXAMPLE 4

The Multi-Radio MS Carrier is Subjected to an Intra-BS Primary Carrier Handover Under the Handover Mode 1

Figure 7:
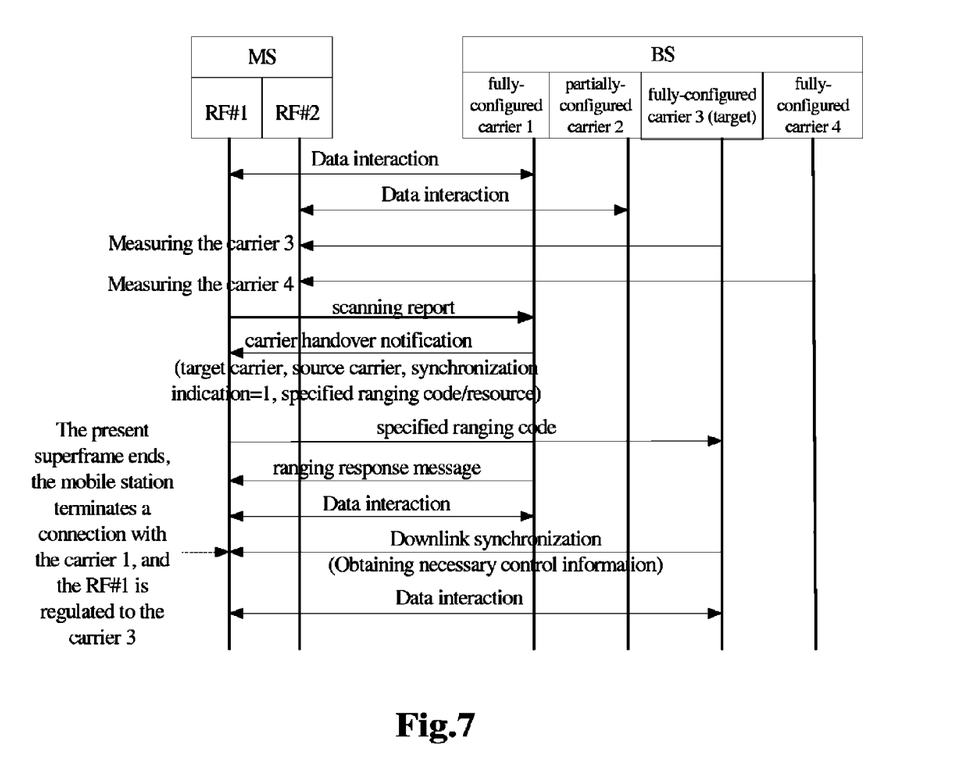
FIG. 7 is a flow chart of Example 4 of the method for intra-BS carrier handover according to an embodiment of the present invention.

FIG. 7 is a flow chart of Example 4 of the method for intra-BS carrier handover according to an embodiment of the present invention. FIG. 7 shows a multi-radio MS and a serving BS, wherein the MS has two channels, which are respectively RF#1 and RF#2, and the serving BS has four carriers, which are a fully-configured carrier 1, a partially-configured carrier 2, a fully-configured carrier 3, and a fully-configured carrier 4. The primary carrier of the MS is the fully-configured carrier 1 located in the RF#1, and the secondary carrier of the MS is the partially configured carrier 2 located in the RF#2. The process that the multi-radio MS carrier is subjected to an intra-BS primary carrier handover in the handover mode 1 includes the following processes:

Step 1: the MS scans other carriers of the BS (viz. the above predetermined carriers, and in the present embodiment, the predetermined carriers are carrier 3 and carrier 4) using the RF#2 in a scanning interval and sends a scanning report (corresponding to Step S302 in FIG. 3).

Step 2: the BS selects the fully-configured carrier 3 as the target carrier, informs the MS on the fully-configured carrier 1, and meanwhile sends the frequency of the fully-configured carrier 1, synchronization indication=1 (1 represents that the MS needs to be synchronized with the serving BS on the target carrier), a specified ranging code, and specified ranging resource of the fully-configured carrier 3 (corresponding to Step S304 in FIG. 3).

Step 3: the MS sends the specified ranging code using the RF#1 at the indicated time-frequency position of the fully-configured carrier 3.

Step 4: the MS receives a ranging response message on the fully-configured carrier 1. The MS and the BS achieve uplink synchronization on the fully-configured carrier 3.

Step 5: the MS maintains a connection with the BS on the RF#1 (the fully-configured carrier 1) until the present superframe ends.

Step 6: when the next superframe begins, the RF#1 of the MS is regulated to the fully-configured carrier 3, necessary control information is parsed (e.g. resource assignment information), it interacts services and control information with the BS, and the fully-configured carrier 3 becomes a new primary carrier of the MS, located in the RF#1 (step 3 to step 6 correspond to Step S306 in FIG. 3).

By the above processes, the intra-BS primary carrier handover is realized for the multi-radio MS carrier in the handover mode 1.

EXAMPLE 5

The Multi-Radio MS Carrier is Subjected to an intra-BS Primary Carrier Handover Under the Handover Mode 2

Figure 8:
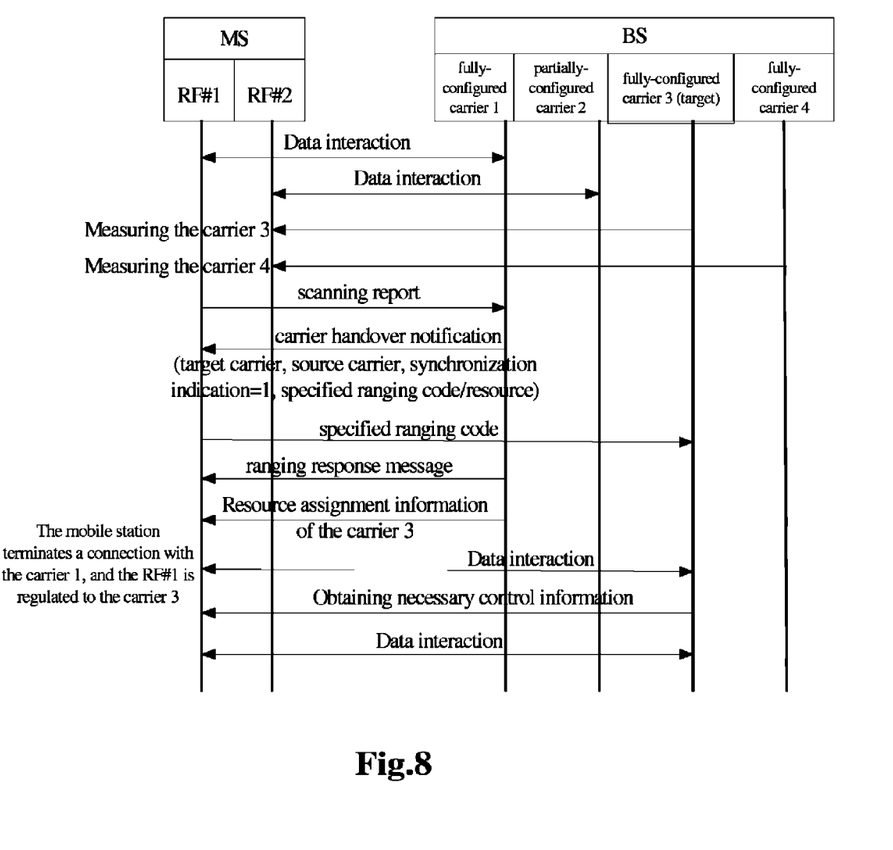
FIG. 8 is a flow chart of Example 5 of the method for intra-BS carrier handover according to an embodiment of the present invention.

FIG. 8 is a flow chart of Example 5 of the method for intra-BS carrier handover according to an embodiment of the present invention. As shown in FIG. 8, there are included the following processes:

Step 1: the MS scans other carriers of the BS (viz. the above predetermined carriers, and in the present embodiment, the predetermined carriers are carrier 3 and carrier 4) using the RF#2 in a scanning interval and sends a scanning report (corresponding to Step S302 in FIG. 3).

Step 2: the BS selects the fully-configured carrier 3 as the target carrier, informs the MS on the fully-configured carrier 1, and meanwhile sends the frequency of the fully-configured carrier 1, synchronization indication=1 (1 represents that the MS needs to be synchronized with the serving BS on the target carrier), a specified ranging code, and specified ranging resource of the fully-configured carrier 3 (corresponding to Step S304 in FIG. 3).

Step 3: the MS sends the specified ranging code using the RF#1 at the indicated time-frequency position of the fully-configured carrier 3.

Step 4: the MS receives a ranging response message on the fully-configured carrier 1. The MS and the BS achieve uplink synchronization on the fully-configured carrier 3.

Step 5: the BS assigns resource for the MS on the fully-configured carrier 3 and sends resource assignment information to the MS via the fully-configured carrier 1.

Step 6: the RF#1 of the MS terminates the connection with the fully-configured carrier 1, is regulated to the fully-configured carrier 3, and receives or sends data at the indicated position.

Step 7: when the next superframe begins, the MS parses necessary control message (e.g. resource assignment information), interacts services and control information with the BS on the fully-configured carrier 3, and the fully-configured carrier 3 becomes a new primary carrier of the MS, located in the RF#1 (step 3 to step 7 correspond to Step S306 in FIG. 3).

By the above processes, the intra-BS primary carrier handover is realized for the multi-radio MS carrier in the handover mode 2.

EXAMPLE 6

An Intra-BS Secondary Carrier Handover of a Multi-Radio MS

Figure 9:
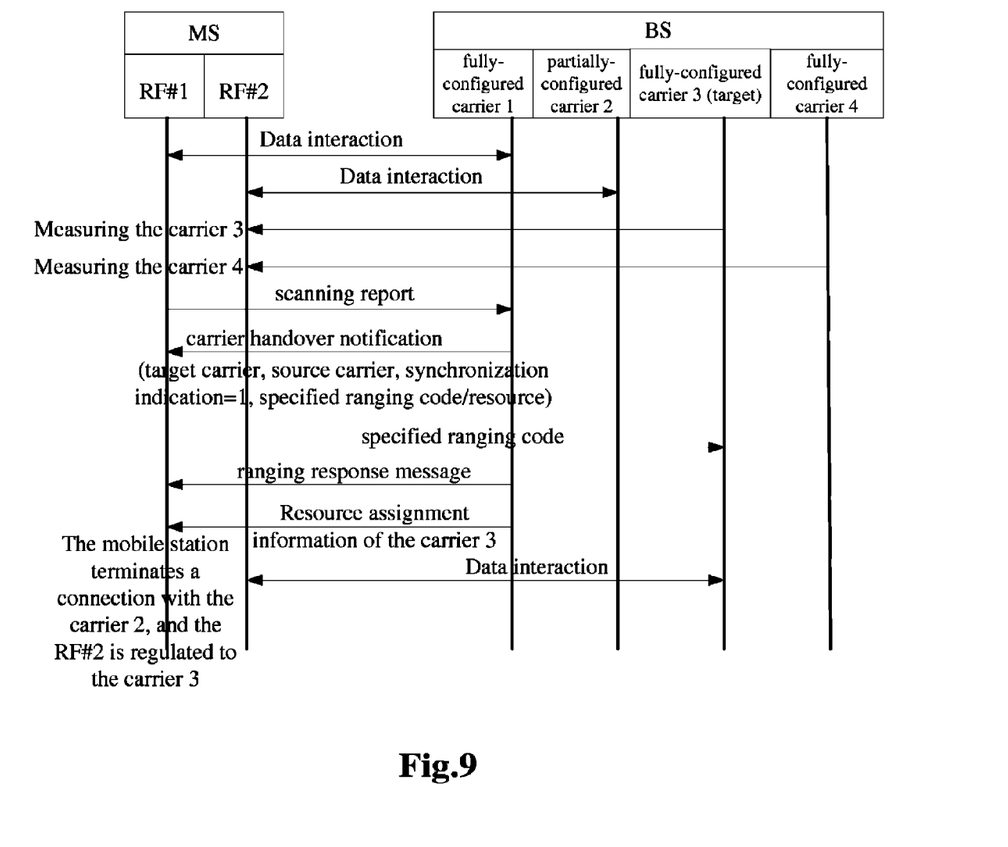
FIG. 9 is a flow chart of Example 6 of the method for intra-BS carrier handover according to an embodiment of the present invention.

FIG. 9 is a flow chart of Example 6 of the method for intra-BS carrier handover according to an embodiment of the present invention. As shown in FIG. 9, there are included the following processes:

Step 1: the MS scans other carriers of the BS (viz. the above predetermined carriers, and in the present embodiment, the predetermined carriers are carrier 3 and carrier 4) using the RF#2 in a scanning interval and sends a scanning report (corresponding to Step S302 in FIG. 3).

Step 2: the BS selects the fully-configured carrier 3 as the target carrier, informs the MS on the fully-configured carrier 1, and meanwhile sends the frequency of the partially-configured carrier 2, synchronization indication=1 (1 represents that the MS needs to be synchronized with the serving BS on the target carrier), a specified ranging code, and specified ranging resource of the fully-configured carrier 3 (corresponding to Step S304 of FIG. 3).

Step 3: the MS sends the specified ranging code using the RF#2 at the indicated time-frequency position of the fully-configured carrier 3.

Step 4: the MS receives a ranging response message on the fully-configured carrier 1. The MS and the BS achieve uplink synchronization on the fully-configured carrier 3.

Step 5: the BS assigns resource for the MS on the fully-configured carrier 3 and sends resource assignment information to the MS via the fully-configured carrier 1.

Step 6: the RF#2 of the MS terminates the connection with the partially-configured carrier 2, is regulated to the fully-configured carrier 3, and receives or sends data at the indicated position (step 3 to step 6 correspond to Step S306 in FIG. 3).

By the above processes, an intra-BS secondary carrier handover of a multi-radio MS is realized.

System Embodiments

Figure 10:
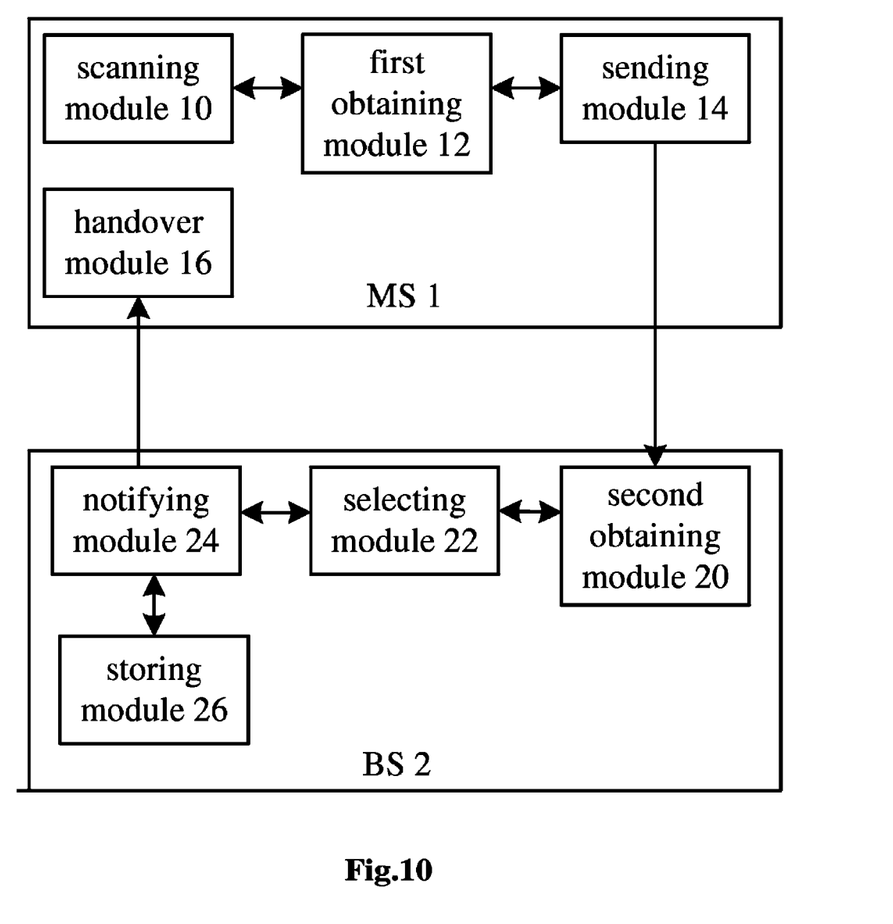
FIG. 10 is a block diagram of the system for intra-BS carrier handover according to an embodiment of the present invention.

According to an embodiment of the present invention, there is provided a system for intra-BS carrier handover, used for the handover of carriers within a base station in a multi-carrier system, for example, it can be used for implementing the above method for intra-BS carrier handover provided in the embodiments and the examples. FIG. 10 is a frame diagram of the system for intra-BS carrier handover according to an embodiment of the present invention, as shown in FIG. 10, wherein the system comprises a mobile station 1 (a scanning module 10, a first obtaining module 12, a sending module 14, and a handover module 16) and a base station 2 (a second obtaining module 20, a selecting module 22, a notifying module 24, and a storing module 26).

Specifically, the mobile station 1 comprises:

a scanning module 10 configured to scan predetermined carriers within the base station 2 based on predetermined rules; a first obtaining module 12 connected to the scanning module 10 and configured to obtain a scanning report comprising channel quality information of part of or all of the predetermined carriers; and a sending module 14 connected to the first obtaining module 12 and configured to send the scanning report obtained by the first obtaining module 12 to the base station 2, wherein the above predetermined carriers are: fully-configured carriers and partially-configured carriers supported by the mobile station 1 and configured in the base station 2 except the primary carrier and the secondary carrier of the mobile station 1.

In the present invention, there is no limitation to the scanning manner of the scanning module 10. Several examples for the scanning manner are provided as follows, for example, the scanning module 10 can periodically scan the predetermined carriers according to information related to multi-carrier scanning; the scanning module 10 can also scan the predetermined carriers in the event-triggering manner according to the information related to multi-carrier scanning; in addition, the scanning module 10 can also receive a notifying message sent by the base station 2 and scan the predetermined carriers according to scanning information carried in the notifying message, wherein the scanning information comprises at least one of the followings: a list of carriers to be scanned, a start time for scanning, and a scanning interval.

The base station 2 comprises:

a second obtaining module 20 configured to obtain the channel quality information in the scanning report; a selecting module 22 connected to the second obtaining module 20 and configured to select a target carrier from the predetermined carriers; a notifying module 24 connected to the selecting module 22 and configured to inform the mobile station 1 of the selected target carrier via a carrier handover notifying message; and a storing module 26 configured to store a mapping relationship between an identifier of the mobile station 1, a specified ranging code, and specified ranging resource.

The selecting module 22 selects the target carrier based on the following rules: selecting a target carrier and channel quality information based on carrier load conditions previously obtained before selecting the target carrier, moreover, in the case that the source carrier of the base station 1 is a primary carrier of the mobile station 1, the target carrier is a fully-configured carrier; and in the case that the source carrier is a secondary carrier of the mobile station 1, the target carrier is a fully-configured carrier or a partially-configured carrier.

The carrier handover notifying message sent by the notifying module 24 to the mobile station 1 can carry source carrier information of the mobile station 1 and indication information indicating whether to perform synchronization on the target carrier, wherein in the case that the target carrier and the source carrier meet the predetermined conditions, the notifying module 24 can also carry a specified ranging code and specified ranging resource information of the target carrier in the carrier handover notification.

As an implementing manner, the above predetermined conditions can be set as follows: the center frequency difference between the target carrier and the source carrier is greater than a predetermined frequency difference f. That is to say, in the case that the center frequency difference between the target carrier and the source carrier is less than f, the mobile station 1 and the base station 2 do not need any synchronization. In the case that the center frequency difference between the target carrier and the source carrier is greater than f, the notifying module 24 further carries the specified ranging code and the specified ranging resource information of the target carrier in the carrier handover notification. Preferably, the storing module 26 of the base station 2 also stores a mapping relationship among an identifier of the mobile station 1, a specified ranging code, and specified ranging resource.

In the case that the predetermined conditions are met and synchronization with the base station 2 on the target carrier is needed, the sending module 14 of the mobile station 1 needs to send a specified ranging code on the specified ranging resource of the target carrier, moreover, after sending the specified ranging code, there is no need to wait for a response message on the target carrier but need to receive on the primary carrier a ranging response message sent by the base station 2 based on the previously stored mapping relationship.

The handover module 16 of the mobile station 1 hands over from the source carrier to the target carrier in the predetermined manner in response to the ranging response message received on its primary carrier.

In the case that the source carrier is a primary carrier of the mobile station 1, the handover module 16 may perform handover using the following two modes:

Handover Mode 1

1. A handover time is preset, and before the handover time arrives, the handover module 16 maintains a connection between the mobile station 1 and the base station 2 on the current primary carrier.

2. When the handover time arrives, the handover module 16 handover the mobile station 1 to the target carrier, parses the obtained control information on the target carrier, and takes the target carrier as a primary carrier.

Handover Mode 2

1. The mobile station 1 receives via the source carrier a notification of assigning resource for it on the target carrier by the base station 2.

2. The mobile station 1 receives or sends data at the indicated position of the target carrier according to the notification of assigning resource.

3. In the case that the next superframe begins, the mobile station 1 parses the control information obtained from the target carrier, and takes the target carrier as a primary carrier.

In the case that the above source carrier is a secondary carrier of the mobile station 1, the manners for the handover module 16 to perform carrier handover are: 1. receiving via the primary carrier a notification of assigning resource for it on the target carrier by the base station 2; 2. in response to the notification of assigning resource, making the mobile station 1 terminate a connection with the source carrier, hand over to the target carrier, and receive or send data at the indicated position of the target carrier.

To sum up, by means of the technical solution of the present invention, the problem present in the related art that the service continuity of the mobile station can not be guaranteed due to handover interruption time delay is solved by virtue of the intra-BS carrier handover solution of the present invention, thereby the mobile station can perform seamless handover between of intra-BS carriers in the multi-carrier system for ensuring the service continuity of the mobile station to further eliminate carrier handover time delay.

In addition, the embodiments can be implemented by a hardware, a software, a firmware, a middleware, a microcode, a hardware description language or combinations thereof. When the software, the firmware, the middleware or the microcode is used for implementation, a program code or code segment for executing necessary tasks may be stored in a machine readable medium such as a storage medium. (A plurality of) processors may execute necessary tasks. The code segment may represent a process, a function, a subprogram, a program, a routine, a subroutine, a module, an object, a software package, a class, an instruction, data structure or any combination of programming languages. A code segment can be coupled to another code segment or a hardware circuit by transmitting and/or receiving information, data, independent variable or storage content. Information, independent variables, parameters, data, etc. can be transferred, transmitted, or forwarded in any suitable manners including memory sharing, messaging, token passing, network transmission, etc.

The descriptions above are only the preferable embodiments of the present invention, which are not used to restrict the present invention. For those skilled in the art, the present invention may have various changes and variations. Any amendments, equivalent substitutions, improvements, etc. within the spirit and principle of the present invention are all included in the scope of protection of the present invention.

What is claimed is:

1. A method for intra-BS carrier handover, used for the handover of carriers within a base station in a multi-carrier system, the method comprising:
 a mobile station scanning predetermined carriers within the base station based on predetermined rules, wherein the predetermined carriers comprises fully-configured carriers and partially-configured carriers supported by the mobile station and configured by the base station, except a primary carrier and a secondary carrier of the mobile station; obtaining a scanning report comprising channel quality information of part of or all of the predetermined carriers; and sending the scanning report to the base station;
 the base station obtaining the channel quality information in the scanning report; selecting a target carrier from the predetermined carriers; and informing the mobile station of the selected target carrier via a message; and
 the mobile station handing over to the target carrier in a predetermined manner in response to the message.

2. The method according to claim 1, wherein before the step of the mobile station scanning the predetermined carriers based on the predetermined rules, the method further comprises:
 the mobile station obtaining, via its primary carrier, broadcast information related to multi-carrier operations and configuration information of other carriers except the current primary carrier, which are configured in the base station, and obtaining information related to multi-carrier scanning according to the configuration information and the broadcast information related to multi-carrier operations.

3. The method according to claim 2, wherein the predetermined rules comprise at least one of the followings:
 the mobile station periodically scanning the predetermined carriers according to the information related to multi-carrier scanning;
 the mobile station scanning the predetermined carriers in an event triggering manner based on the information related to multi-carrier scanning; and
 the mobile station receiving a notifying message sent by the base station, and scanning the predetermined carriers based on scanning information carried in the notifying message, wherein the scanning information comprises at least one of the followings: a list of carriers to be scanned, a start time for scanning and a scanning interval.

4. The method according to claim 1, wherein the predetermined rules comprise at least one of the followings:
 the mobile station periodically scanning the predetermined carriers according to the information related to multi-carrier scanning;
 the mobile station scanning the predetermined carriers in an event triggering manner based on the information related to multi-carrier scanning; and
 the mobile station receiving a notifying message sent by the base station, and scanning the predetermined carriers based on scanning information carried in the notifying message, wherein the scanning information comprises at least one of the followings: a list of carriers to be scanned, a start time for scanning and a scanning interval.

5. The method according to claim 4, wherein in the case that the source carrier is a primary carrier of the mobile station, the predetermined manner comprises:
 the mobile station maintaining a connection with the base station on the current main carrier, before predetermined time arrives; and
 when the predetermined time arrives, the mobile station handing over to the target carrier, parsing the obtained control information on the target carrier, and taking the target carrier as a primary carrier of the mobile station.

6. The method according to claim 4, wherein in the case that the source carrier is a primary carrier of the mobile station, the predetermined manner comprises:
 the mobile station receiving, via the source carrier, a notification of assigning resource for the mobile station on the target carrier by the base station;
 the mobile station receiving or sending data at the indicated position of the target carrier according to the notification of assigning resource; and
 the mobile station parsing the control information obtained by the mobile station from the target carrier and taking the target carrier as a primary carrier of the mobile station when the next superframe arrives.

7. The method according to claim 4, wherein in the case that the source carrier is a secondary carrier of the mobile station, the predetermined manner comprises:
 the mobile station receiving, via the primary carrier, a notification of assigning resource for the mobile station on the target carrier by the base station; and
 in response to the notification of assigning resource, the mobile station terminating a connection with the source carrier, handing over to the target carrier, and receiving or sending data at the indicated position of the target carrier.

8. The method according to claim 1, wherein the step of the base station selecting a target carrier comprises:
 the base station selecting the target carrier based on the channel quality information and carrier load conditions obtained in advance by the base station, moreover if a source carrier of the mobile station is a primary carrier of the mobile station, the target carrier is a fully-configured carrier; and if the source carrier is a secondary carrier of the mobile station, the target carrier is the fully-configured carrier or the partially-configured carrier.

9. The method according to claim 1, wherein the message is a carrier handover notifying message.

10. The method according to claim 9, wherein the carrier handover notifying message carries source carrier information of the mobile station and indication information indicating whether to perform synchronization on the target carrier, moreover, in the case that the target carrier and the source carrier meet a predetermined condition, the carrier handover notification also carries at least one of the followings: a specified ranging code and specified ranging resource information on the target carrier.

11. The method according to claim 10, wherein the predetermined condition is: the center frequency difference between the target carrier and the source carrier is greater than a predetermined frequency difference f.

12. The method according to claim 11, wherein after the predetermined condition is met and the base station sends the carrier handover notification, the method further comprises:
 the base station storing a mapping relationship among a mobile station identifier, the specified ranging code, and the specified ranging resource.

13. The method according to claim 12, wherein in the case that the carrier handover notifying message carries the indication information and the indication information indicates that synchronization is needed, the step of handing over the mobile station to the target carrier in a predetermined manner comprises:

the mobile station sending the specified ranging code on the specified ranging resource of the target carrier in response to the carrier handover notifying message; and the mobile station receiving on its primary carrier a ranging response message sent by the base station based on the mapping relationship and handing over in the predetermined manner from the source carrier to the target carrier.

14. The method according to claim 1, wherein in the case that the source carrier is a primary carrier of the mobile station, the predetermined manner comprises:

the mobile station maintaining a connection with the base station on the current main carrier, before predetermined time arrives; and when the predetermined time arrives, the mobile station handing over to the target carrier, parsing the obtained control information on the target carrier, and taking the target carrier as a primary carrier of the mobile station.

15. The method according to claim 1, wherein in the case that the source carrier is a primary carrier of the mobile station, the predetermined manner comprises:

the mobile station receiving, via the source carrier, a notification of assigning resource for the mobile station on the target carrier by the base station;

the mobile station receiving or sending data at the indicated position of the target carrier according to the notification of assigning resource; and the mobile station parsing the control information obtained by the mobile station from the target carrier and taking the target carrier as a primary carrier of the mobile station when the next superframe arrives.

16. The method according to claim 1, wherein in the case that the source carrier is a secondary carrier of the mobile station, the predetermined manner comprises:

the mobile station receiving, via the primary carrier, a notification of assigning resource for the mobile station on the target carrier by the base station; and in response to the notification of assigning resource, the mobile station terminating a connection with the source carrier, handing over to the target carrier, and receiving or sending data at the indicated position of the target carrier.

17. A system for intra-BS carrier handover, used for the handover of carriers within a base station in a multi-carrier system, the system comprising:

a mobile station, configured to scan predetermined carriers within the base station based on predetermined rules, wherein the predetermined carriers comprises fully-configured carriers and partially-configured carriers supported by the mobile station and configured by the base station, except a primary carrier and a secondary carrier of the mobile station, obtain a scanning report comprising channel quality information of part of or all of the predetermined carriers, and send the scanning report to the base station;

the base station, configured to obtain the channel quality information in the scanning report, select a target carrier from the predetermined carriers, and inform the mobile station of the selected target carrier via a carrier handover notifying message; and the mobile station, further configured to hand over to the target carrier in a predetermined manner based on a predetermined message of the base station.

18. The system according to claim 17, wherein in the case that the source carrier is a primary carrier of the mobile station, the predetermined manner comprises: presetting a handover time, and before the handover time arrives, maintaining, by the mobile station, a connection with the base station on the current primary carrier;

when the handover time arrives, the mobile station hands over to the target carrier, parses the obtained control information on the target carrier, and takes the target carrier as a primary carrier of the mobile station; or the mobile station receives via the source carrier a notification of assigning resource for the mobile station on the target carrier by the base station;

the mobile station receives or sends data at the indicated position of the target carrier according to the notification of assigning resource;

when the next superframe arrives, the mobile station parses the control information obtained by the mobile station from the target carrier and takes the target carrier as a primary carrier of the mobile station; or in the case that the source carrier is a secondary carrier of the mobile station, the predetermined manner comprises: the mobile station receiving, via the primary carrier, a notification of assigning resource for the mobile station on the target carrier by the base station; and in response to the notification of assigning resource, the mobile station terminates a connection with the source carrier, hands over to the target carrier, and receives or sends data at the indicated position of the target carrier.

* * * * *